US012609491B2

(12) United States Patent
Chang et al.

(10) Patent No.: US 12,609,491 B2
(45) Date of Patent: Apr. 21, 2026

(54) ELECTRICAL CONNECTOR

(71) Applicant: Advanced Connectek Inc., New Taipei (TW)

(72) Inventors: Ming-Yung Chang, New Taipei (TW); Jian Bo Luo, New Taipei (TW)

(73) Assignee: Advanced Connectek Inc., New Taipei City (TW)

(*) Notice: Subject to any disclaimer, the term of this patent is extended or adjusted under 35 U.S.C. 154(b) by 538 days.

(21) Appl. No.: 17/989,656

(22) Filed: Nov. 17, 2022

(65) Prior Publication Data

US 2023/0163533 A1 May 25, 2023

(30) Foreign Application Priority Data

Nov. 19, 2021 (CN) ......................... 202111375028.X

(51) Int. Cl.

*H01R 13/6582* (2011.01)
*H01R 13/502* (2006.01)
*H01R 13/6585* (2011.01)
*H01R 24/60* (2011.01)

(52) U.S. Cl.

CPC ....... *H01R 13/6582* (2013.01); *H01R 13/502* (2013.01); *H01R 24/60* (2013.01); *H01R 13/6585* (2013.01)

(58) Field of Classification Search

CPC ........................... H01R 24/60; H01R 13/6582; H01R 13/6583; H01R 13/6585; H01R 13/6586; H01R 13/6587; H01R 13/6591; H01R 13/6596

See application file for complete search history.

(56) References Cited

U.S. PATENT DOCUMENTS

| | | | | |
|---|---|---|---|---|
| 10,297,954 B2 * | 5/2019 | Tsai | ..................... | H01R 13/502 |
| 10,361,518 B2 * | 7/2019 | Zhang | ................ | H01R 13/6583 |
| 2018/0294604 A1 * | 10/2018 | Chien | ................ | H01R 13/6581 |
| 2019/0036264 A1 * | 1/2019 | Chien | .................. | H01R 13/506 |

* cited by examiner

*Primary Examiner* — Renee S Luebke
*Assistant Examiner* — Paul D Baillargeon
(74) *Attorney, Agent, or Firm* — JCIPRNET

(57) ABSTRACT

Provided is an electrical connector, including an inner housing, two first components, multiple terminals respectively disposed in the first components, two second components, two metallic sheets, and an outer housing accommodating the inner housing, the terminals, the first components, the second components, and the metallic sheets. The inner housing has a insertion space, an inner wall surface facing towards the insertion space, an outer wall surface facing away from the insertion space, and multiple first openings connecting the inner wall surface and the outer wall surface. The terminals are assembled to the outer wall surface along with the first components. Connecting ends of the terminals extend from the outer wall surface through the first openings to the insertion space. The second components assembled to the inner housing shield the connecting ends and the first openings. The metallic sheets are assembled to the inner housing and stacked on the second components.

20 Claims, 7 Drawing Sheets

ELECTRICAL CONNECTOR

CROSS-REFERENCE TO RELATED APPLICATION

This application claims the priority benefit of China patent application serial no. 202111375028.X, filed on Nov. 19, 2021. The entirety of the above-mentioned patent application is hereby incorporated by reference herein and made a part of this specification.

BACKGROUND

Technical Field

The disclosure relates to an electrical connector.

Description of Related Art

With the advance of technology, various connectors for different electronic products have emerged, among which the electrical connector adapted for cables is one of the most ubiquitous connectors. Currently, the type-C connector is a connector widely used for cables as it realizes positive and negative insertion. However, the terminals in the existing type-C connector are disposed on the inner side of the connector housing, making the coplanarity degree of arc height of the terminals relatively unstable and the true position of the terminal-related elements difficult to be controlled. Such design therefore requires the metallic sheet for the terminals to undergo a second shaping processing.

SUMMARY

The disclosure provides an electrical connector capable of controlling effectively the coplanarity degree of arc height of the terminals and reducing the manufacturing difficulty by stacking the elements.

The electrical connector of the disclosure includes an inner housing, two first components, a plurality of terminals, two second components, two metallic sheets, and an outer housing. The inner housing has a insertion space, an inner wall surface, an outer wall surface, and a plurality of first openings. The inner wall surface faces toward the insertion space. The outer wall surface faces away from the insertion space. The first openings connect the inner wall surface and the outer wall surface. The terminals are respectively disposed in the first component and assembled to the outer wall surface along with the first components. Connecting ends of the terminals extend from the outer wall surface through the first opening to the insertion space. The second components are assembled to the inner housing and shield the connecting ends and the first openings. The metallic sheets are assembled to the inner housing and stacked on the second components. The outer housing accommodates the inner housing, the terminals, the first components, the second components, and the metallic sheets.

The electrical connector of the disclosure includes an inner housing, two first components, two terminal module, and an outer housing. The inner housing has a insertion space, an inner wall surface, an outer wall surface, and a plurality of first openings. The inner wall surface faces toward the insertion space. The outer wall surface faces away from the insertion space. The first openings connect the inner wall surface and the outer wall surface. Each terminal module comprises a first component and one set of terminals, and each terminal module is disposed on the outer wall surface of the inner housing. A plurality of connecting ends of the terminals extend from the outer wall surface through the first openings to the insertion space, and another electrical connector is suitable to be inserted into the insertion space along an insertion axis and connected with the connecting ends. The outer housing accommodates the inner housing, the terminals, and the two first components.

In an embodiment of the disclosure, the two first components, the two second components, the two metallic sheets, and the terminals are disposed symmetrically with respect to the inner housing.

In an embodiment of the disclosure, a gap exists between the first components and the inner housing along the insertion axis, and the second components fill the gap.

In an embodiment of the disclosure, the second components are structurally connected subsequently between the first components and the inner housing.

In an embodiment of the disclosure, the first components have a positioning protrusion, the inner housing has a first positioning groove, and the positioning protrusion is fitted into the first positioning groove.

In an embodiment of the disclosure, the metallic sheets have a plurality of positioning bends respectively fitted into a second positioning groove of the inner housing and a third positioning groove of the first components.

In an embodiment of the disclosure, the metallic sheets further have a plurality of bent contact fingers, the inner housing further has a plurality of second openings connecting the inner wall surface and the outer wall surface, and the bent contact fingers pass through the second opening and protrude from the inner wall surface.

In an embodiment of the disclosure, the electrical connector further includes a grounding sheet disposed in the inner housing and partially extending into the insertion space.

In an embodiment of the disclosure, the inner housing includes two inner housing parts forming a closed annular structure and the insertion space, each of the inner housing parts has part of the outer wall surface, part of the inner wall surface, and part of the first openings.

In an embodiment of the disclosure, the electrical connector further includes a grounding sheet assembled and clamped between the two inner housing parts.

Based on the above, in the electrical connector of the disclosure, the first components of an insulator is disposed in the inner housing and partially overlapped on the outer wall surface, and the connecting ends of the terminals extend to the insertion space through the first openings of the inner housing, then the second components is assembled to the outer wall of the inner housing and shields the first openings and the connecting ends, and the metallic sheets are disposed on the outer wall surface of the inner housing and stacked on the second components. Accordingly, these elements may apply a pressure in advance on the terminals during assembly and allow the part where these terminals extend into the insertion space to have good coplanarity degree of arc height due to the overlap of the elements, such that the true position of the elements related to the terminals in the electrical connector may be controlled effectively during the production, and the difficulty in producing the elements related to the terminals in the electrical connector may be reduced, improving the production yield of the electrical connector.

In order to make the above features and advantages of the disclosure more comprehensible, the following embodiments are described in detail with the drawings as follows.

DESCRIPTION OF THE EMBODIMENTS

Figure 1:
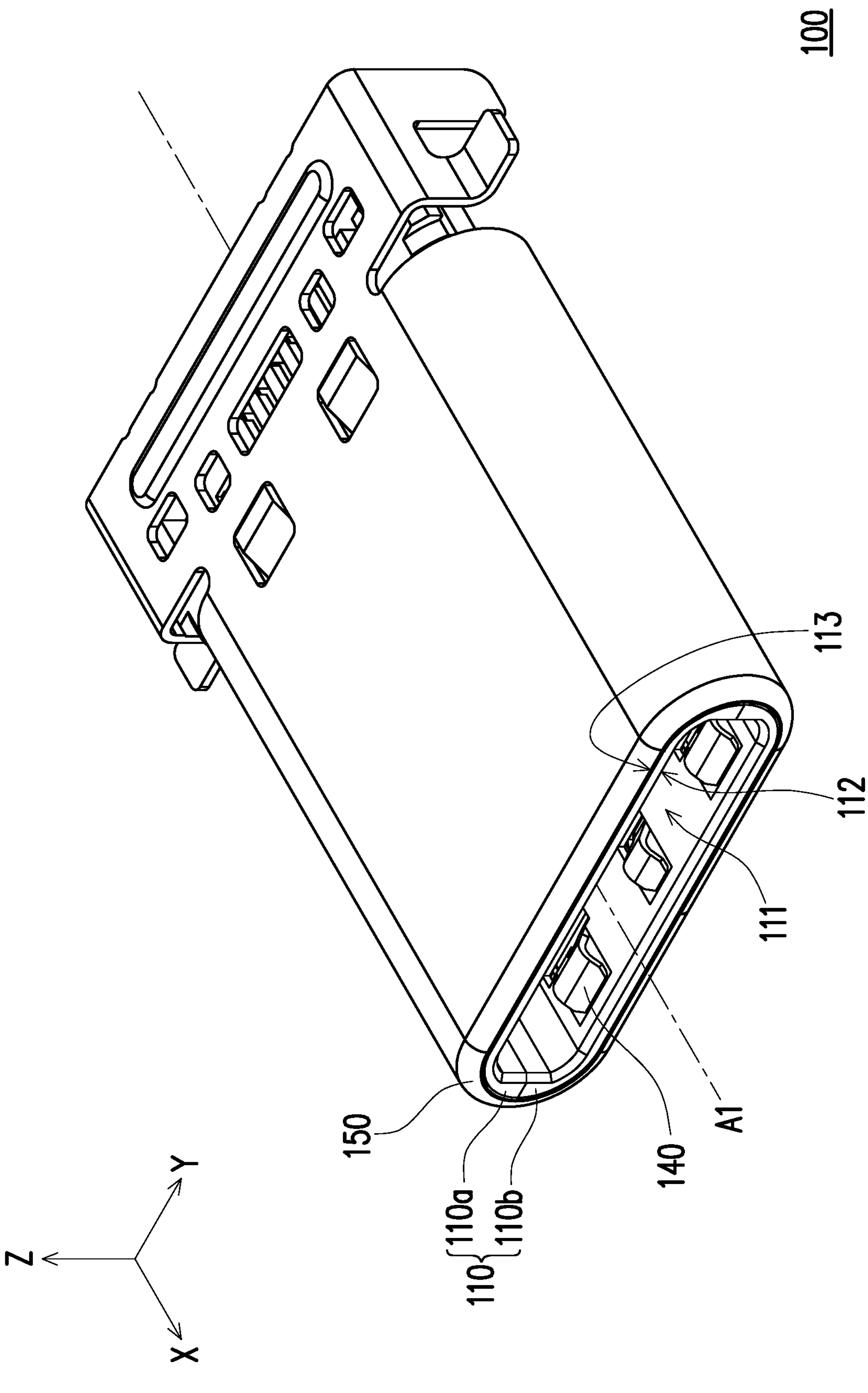
FIG. 1 is a schematic diagram of an electrical connector according to an embodiment of the disclosure.

FIG. 1 is a schematic diagram of an electrical connector according to an embodiment of the disclosure. The rectangular coordinates X-Y-Z are also provided in the drawings for the reference of the subsequent description of elements. In FIG. 1, the electrical connector 100 of this embodiment is, for example, a type-C connector for cables, and it is suitable for connecting with another electrical connector (not shown) along an insertion axis A1 (equivalent to the X-axis).

Figure 2:
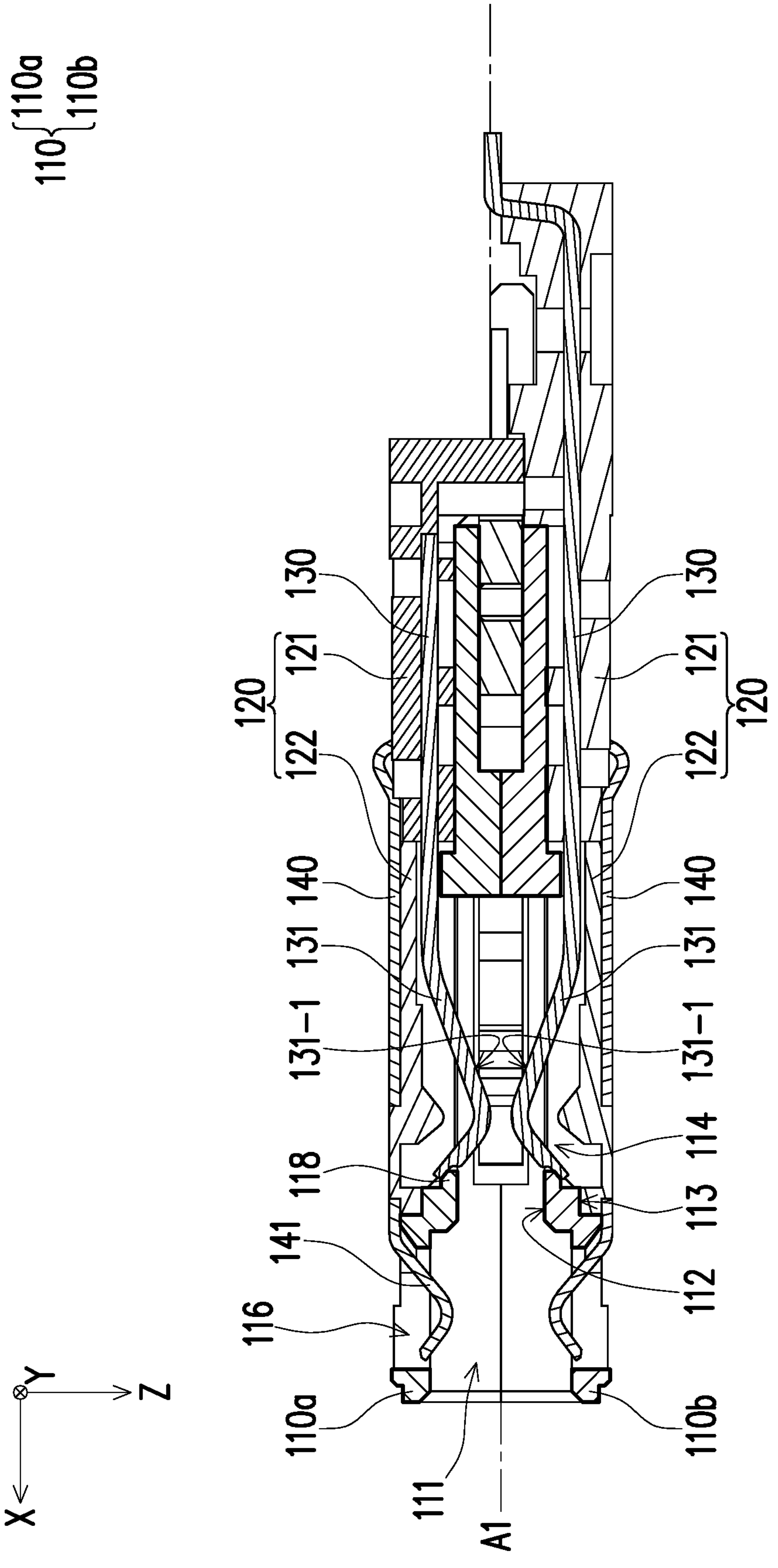
FIG. 2 is a cross-sectional view of part of the elements of the electrical connector in FIG. 1.
Figure 3:
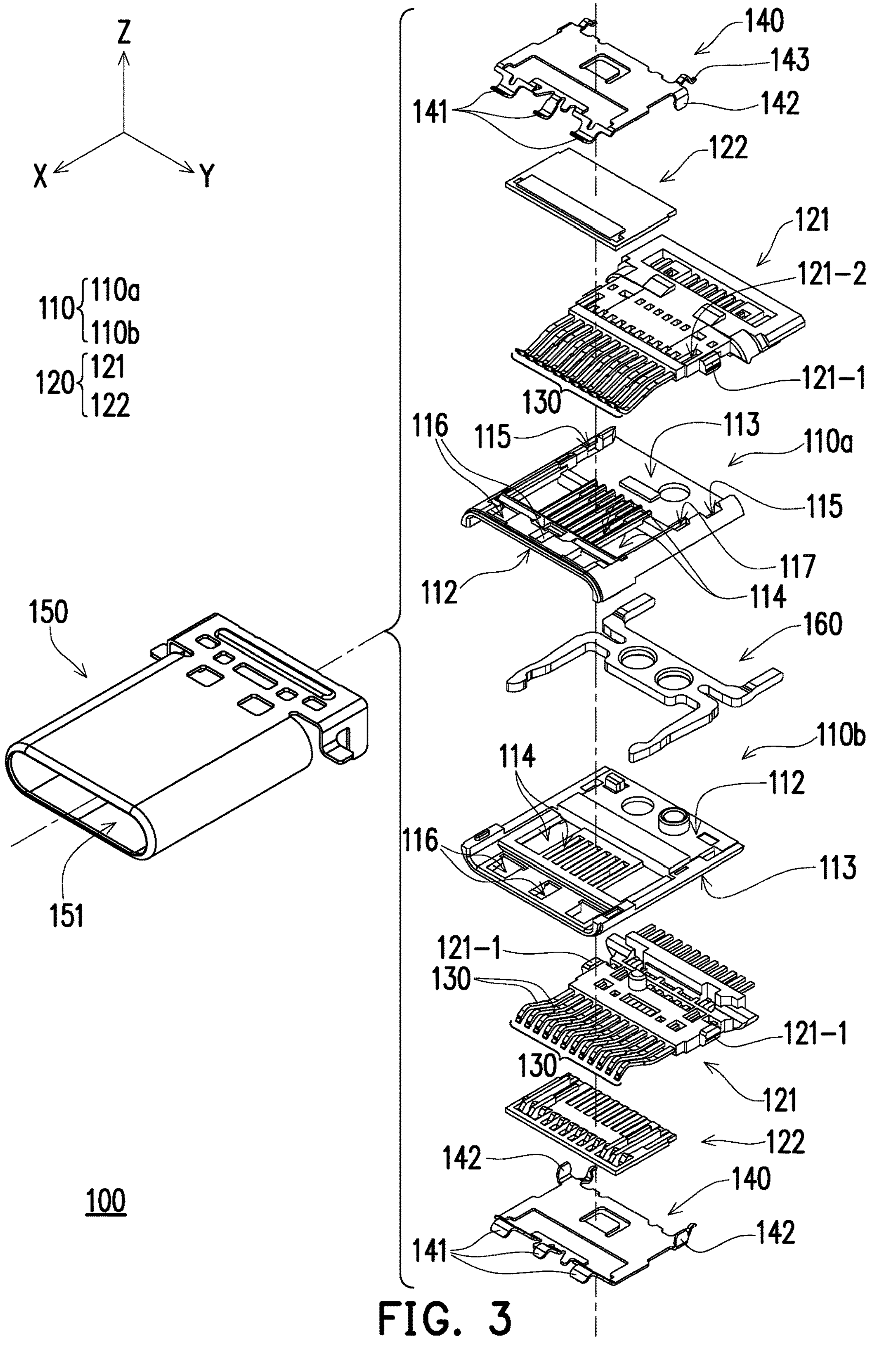
FIG. 3 and FIG. 4 respectively illustrate exploded views of the electrical connector in FIG. 1 from different perspectives.
Figure 4:
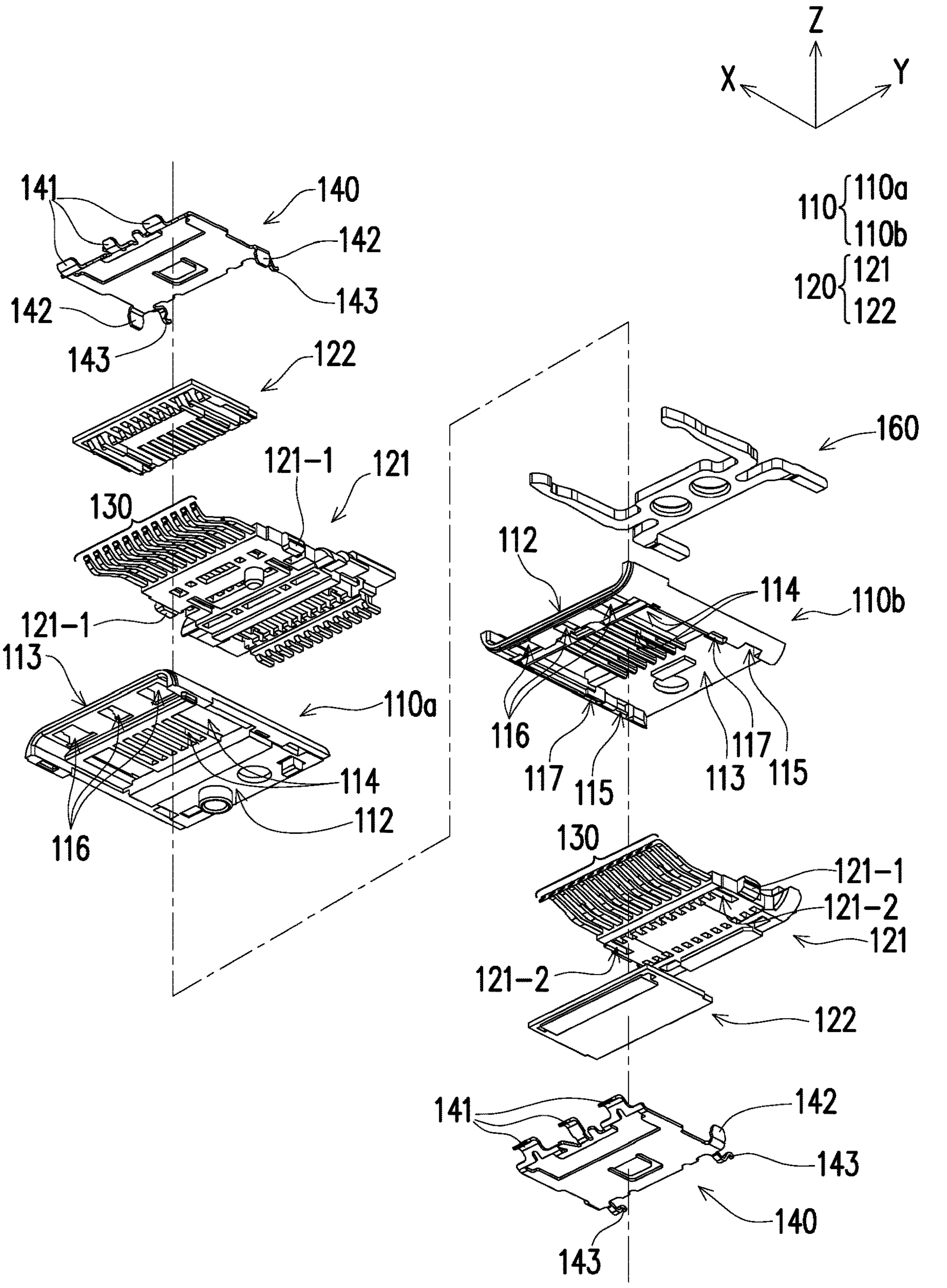

FIG. 2 is a cross-sectional view of part of the elements of the electrical connector in FIG. 1. FIG. 3 and FIG. 4 are respectively exploded views of the electrical connector in FIG. 1 from different perspectives, and FIG. 4 further omits some elements to show the relative relationship of the remaining elements. Note that the housing 150 is omitted in FIG. 2 for a clearer presentation of the structural relationship of the electrical connector 100. Please refer to FIG. 1 to FIG. 4 at the same time. In this embodiment, the electrical connector 100 includes an inner housing 110, two insulators 120, a plurality of terminals 130, two metallic sheets 140, and an outer housing 150.

In this embodiment, the inner housing 110 is an insulative housing and has an insertion space 111, an inner wall surface 112, and an outer wall surface 113. The inner wall surface 112 faces toward the insertion space 111, and the outer wall surface 113 faces away from the insertion space 111. Another electrical connector is suitable to be inserted to the insertion space 111 of the inner housing 110 along the insertion axis A1. Here, the inner housing 110 is composed of two inner housing parts **110*a* and 110*b* that form a closed annular structure and the insertion space 111. The two inner housing parts 110*a* and 110*b* are disposed symmetrically with respect to the insertion axis A1**.

Please refer to FIG. 2 to FIG. 4. In this embodiment, the two insulators 120 and the two metallic sheets 140 correspond to each other and are disposed in the inner housing 110. The two insulators 120 are partially stacked on the outer wall surface 113 of the inner housing 110 along the Z-axis, and the two metallic sheets 140 are disposed on the outer wall surface 113 of the inner housing 110 along the Z-axis. The terminals 130 are disposed along the arrangement axis (equivalent to the Y-axis), and the terminals 130 are respectively disposed on the two insulators 120.

Specifically, in this embodiment, the two insulators 120 are disposed symmetrically with respect to the insertion axis A1, and the two metallic sheets 140 are disposed symmetrically with respect to the insertion axis A1. The inner housing 110 has a plurality of first openings 114, and the terminals 130 protrude from the outer wall surface 113 through the first openings 114 to protrude from the inner wall surface 112 and extend to the insertion space 111, so as to connect with another electrical connector. Each metallic sheet 140 is stacked on the corresponding insulator 120 along the Z-axis to partially cover the portion of the aforementioned terminals 130 extending into the insertion space 111.

In this embodiment, one of the insulators 120 and the corresponding metallic sheet 140 are disposed in the inner housing part **110*a* of the inner housing 110 along the Z-axis, and the other insulator 120 and the corresponding metallic sheet 140 are disposed in the inner housing part 110*b* of the inner housing 110** along the Z-axis.

In this embodiment, the insulator 120 is made of an insulative material and includes a first component 121 and a second component 122, the terminals 130 are disposed in the first component 121 and assembled to the outer wall surface 113 along with the first component 121, the connecting ends 131 (marked in FIG. 2) of the terminals 130 extend through the first opening 114 of the inner housing 110 to the insertion space 111. The second component 122 is assembled to the outer wall surface 113 to shield the first opening 114 and the connecting ends 131. Because the insulator 120 and the metallic sheets 140 are disposed on the outer wall surface 113 of the inner housing 110 and each metallic sheet 140 is stacked on the corresponding insulator 120 along the Z-axis, when the above elements are assembled, a pressure may be applied in advance to the terminals 130 disposed in the insulator 120. Accordingly, the part where the terminals 130 extend into the insertion space 111 has good coplanarity degree of arc height, such that the true position of the elements (for example, the insulator 120 and the metallic sheets 140) related to the terminals 130 may be controlled effectively during the production, and the production difficulty of the elements related to the terminals 130 (such as the insulator 120 and the metallic sheets 140) may be reduced, improving the production yield of the electrical connector 100.

Here, the degree of coplanarity of the arc height refers to the degree of coincidence of the arc surfaces of the part where the terminals 130 extend into the insertion space 111. The true position specifies the geometric shapes and regulates the deviation of the insulator 120 and the metallic sheets 140 from their ideal position according to design.

Please refer to FIG. 3 and FIG. 4. In this embodiment, a grounding sheet 160 is further included. The grounding sheet 160 is assembled and clamped between the two inner housing parts **110*a* and 110*b*, and partially protrudes from the inner wall surface 112. When the electrical connector 100 is connected to another electrical connector, the grounding sheet 160 is adapted to hold another electrical connector, such that this another electrical connector may be firmly seated in the insertion space 111 of the inner housing 110**.

In addition, as shown in FIG. 3 and FIG. 4, the outer housing 150 in this embodiment has an accommodating space 151 for the inner housing 110, the two insulators 120, the terminals 130, the two metallic sheets 140, and the grounding sheet 160 in the accommodating space 151 along the insertion axis A1.

Figure 5:
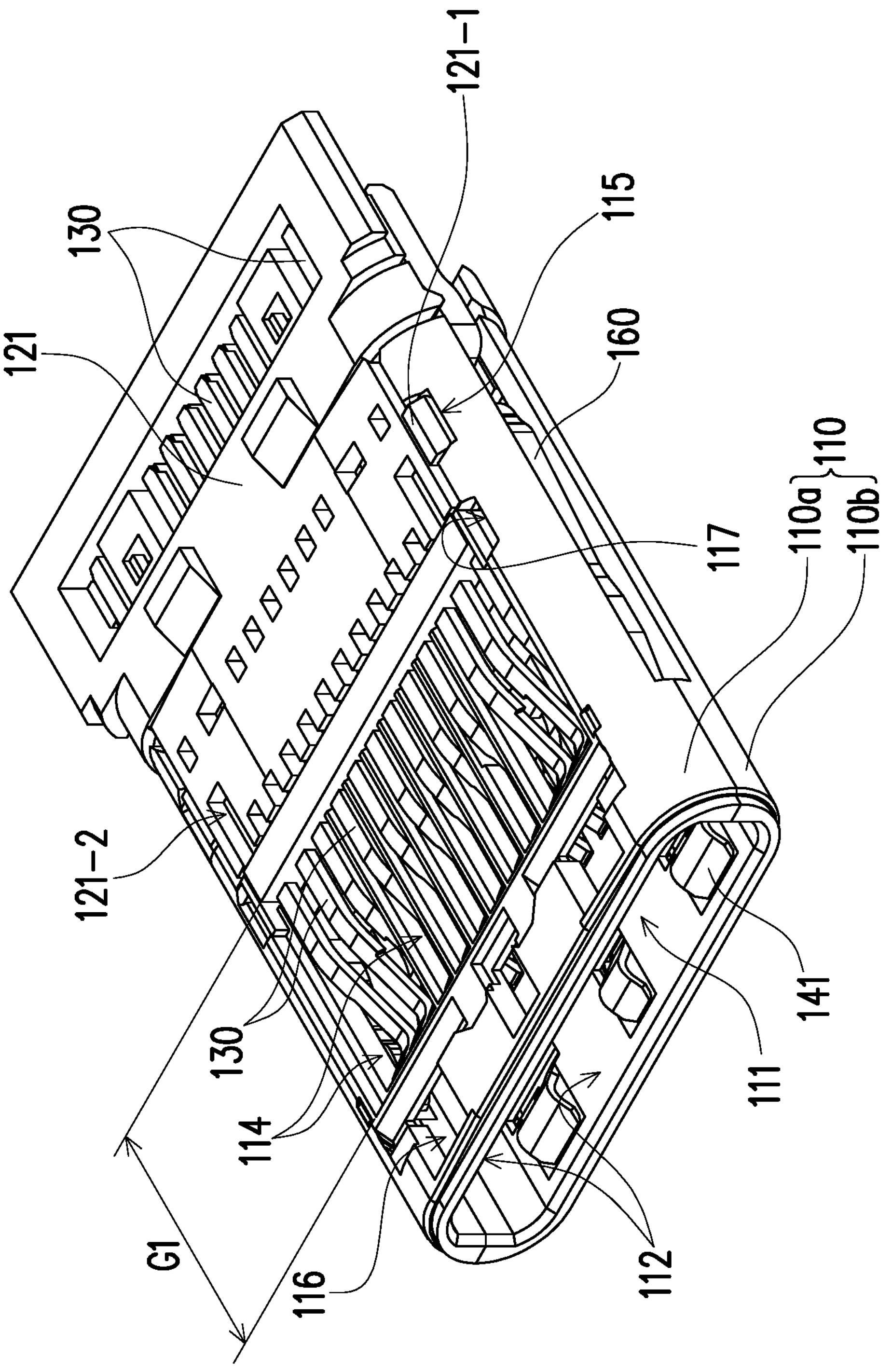
FIG. 5 to FIG. 7 are schematic diagrams of some components of the electrical connector shown in FIG. 1, respectively.
Figure 6:
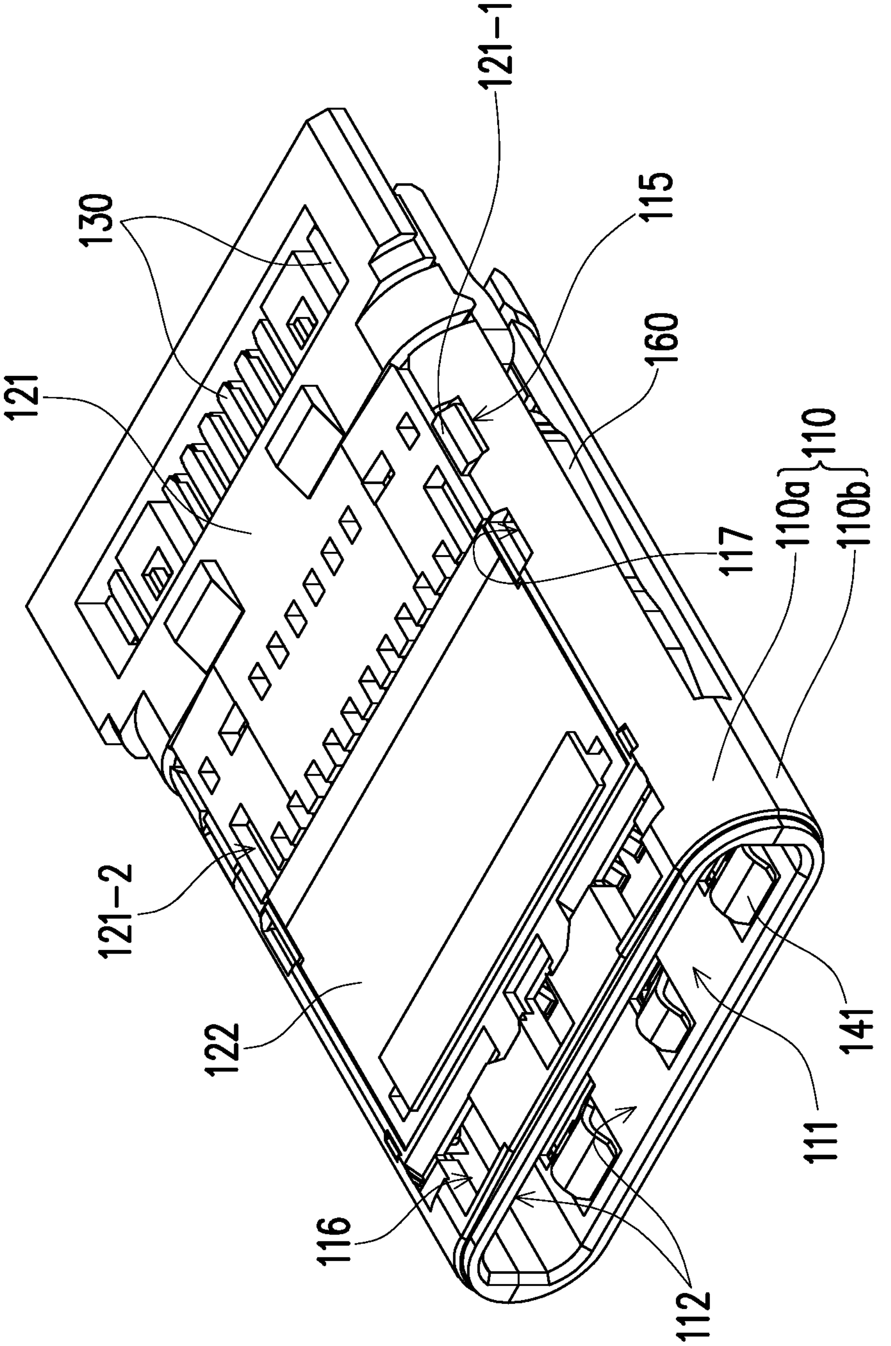
Figure 7:
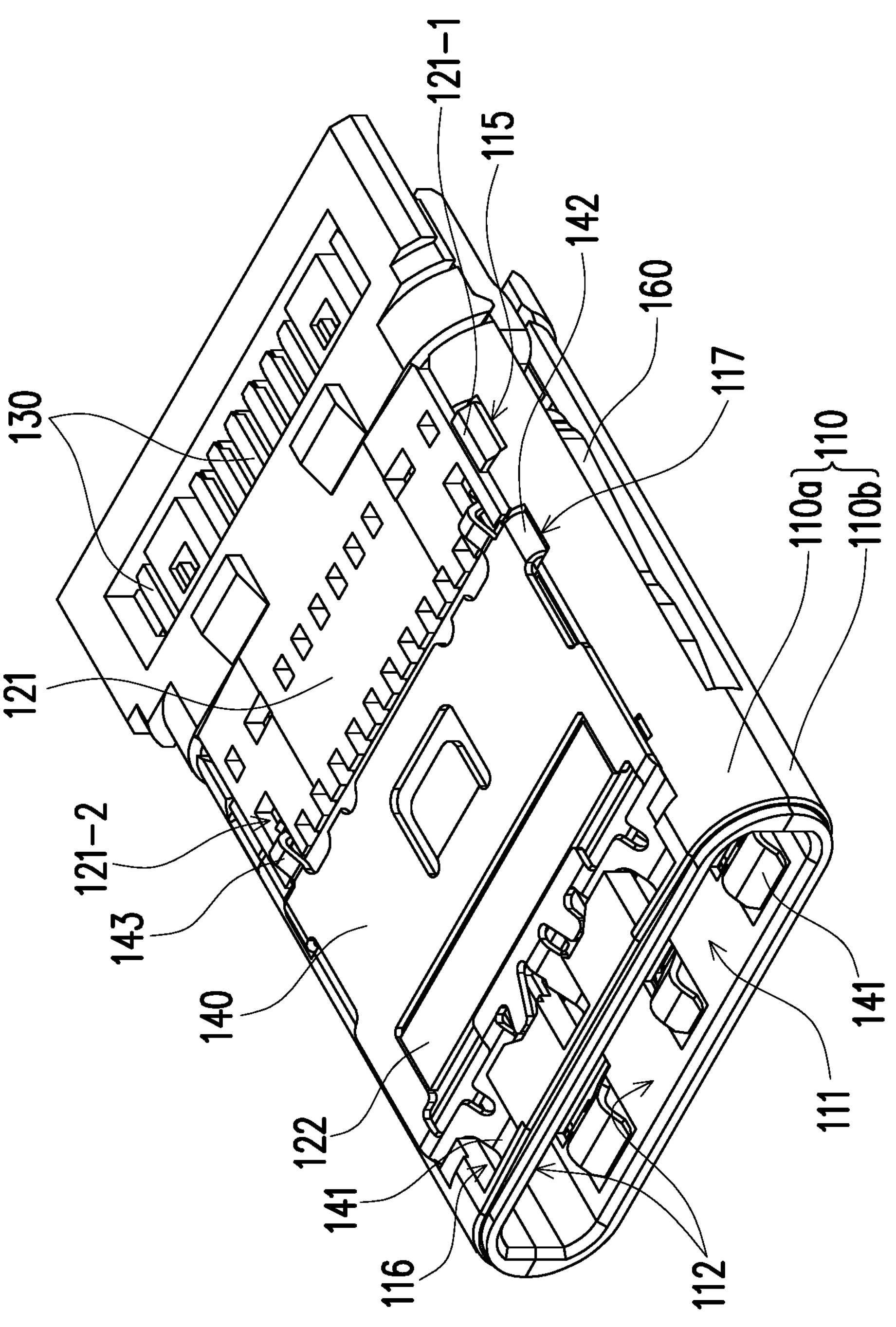

FIG. 5 to FIG. 7 are respectively schematic diagrams of part of elements of the electrical connector shown in FIG. 1. Here, upon the basis of the inner housing 110 (especially the inner housing part **110*a*) shown in FIG. 2, the terminals 130, the first component 121, the second component 122, and the metallic sheets 140 are stacked one by one to show different states in FIG. 5 to FIG. 7. The electrical connector 100** is further described below.

Please refer to FIG. 2, FIG. 3, and FIG. 5. First, in this embodiment, each terminal 130 has the aforementioned connecting end 131 extending into the insertion space 111 and protruding from the inner wall surface 112, and these connecting ends 131 respectively have an arc surface 131-1. Another electrical connector is suitable to be inserted into the insertion space 111 of the inner housing 110 along the insertion axis A1 and connected to the connecting ends 131 of the terminals 130.

In this embodiment, the first openings 114 connect the inner wall surface 112 and the outer wall surface 113, and the connecting ends 131 of the terminals 130 respectively pass through the first openings 114 from the outer wall surface 113 of the inner housing 110 and abut against bearing parts 118 of the inner housing 110. Compared with the suspended connecting ends of the terminals in a conventional electrical connector, the arc surfaces 131-1 of the connecting ends 131 of this embodiment have good coplanarity degree of arc height.

Next, please refer to FIG. 2, FIG. 5, and FIG. 6. In this embodiment, the second component 122 extends from the first component 121 along the X-axis and covers and shields the connecting ends 131 of the first openings 114 and the terminals 130, and the second component 122 is located between the terminals 130 and the corresponding metallic sheets 140, which is equivalent to shielding the part where the terminals 130 extend from the first component 121. In other words, there is a gap G1 between the first component 121 and the inner housing 110 along the insertion axis A1 as shown in FIG. 5, and the second component 122 substantially fills the gap G1 after being assembled to the inner housing 110.

Note here that in this embodiment, the first component 121 and the terminals 130 are combined by, for example, insert molding, but the disclosure is not limited thereto. One of the first component 121 and one set of the terminals 130 forms a terminal module, and each terminal module is disposed on the outer wall surface 113 of the inner housing 110. Meanwhile, the first component 121 and the second component 122 are two independent elements that may be assembled separately, but the disclosure is not limited thereto. In other embodiments, the first component 121 and the second component 122 may be fabricated by integral molding, depending on the requirements of the fabrication process.

Please refer to FIG. 3, FIG. 4, and FIG. 5. In this embodiment, each first component 121 has a positioning protrusion 121-1, and the inner housing 110 has a corresponding first positioning groove 115. The positioning protrusion 121-1 of each first component 121 is fitted into the corresponding first positioning groove 115 of the inner housing 110 to limit the movement of the terminals 130 coupled to the first component 121 in the insertion axis A1 and the arrangement axis.

Please refer to FIG. 2, FIG. 6, and FIG. 7. In this embodiment, the inner housing 110 has a plurality of second openings 116, and the second openings 116 connect the inner wall surface 112 and the outer wall surface 113. Each metallic sheet 140 includes a plurality of bent contact fingers 141, and the second openings 116 correspond to the bent contact fingers 141. Each bent contact 141 passes through the corresponding second opening 116 from the outer wall surface 113 and protrudes from the inner wall surface 112 to connect with another electrical connector inserted in the insertion space 111 of the inner housing 110.

Specifically, each metallic sheet 140 has positioning bends 142 and 143 extending along the Z-axis, the inner housing 110 has a second positioning groove 117 corresponding to the positioning bend 142, and the first component 121 has a third positioning groove 121-2 corresponding to the positioning bend 143. The positioning bend 142 of each metallic sheet 140 is fitted into the corresponding second positioning groove 117 of the inner housing 110 along the Z-axis, and the positioning bend 143 is fitted into the third positioning groove 121-2 of the first component 121, so as to limit the movement of the metallic sheets 140 in the insertion axis A1 and the arrangement axis while securing the fixed relationship between the metallic sheet 140 and the inner housing 110 and the fixed relationship between the metallic sheet 140 and the first component 121.

To sum up, in the electrical connector of the disclosure, as the insulator is disposed in the inner housing and partially overlapped on the outer wall surface, and the metallic sheets are disposed on the outer wall surface of the inner housing and stacked on the insulator, the elements are able to apply a pressure in advance on the terminals disposed on the insulator during assembly. Accordingly, the part where the terminals extend into the insertion space has good coplanarity degree of arc height due to the overlap of the elements, such that the true position of the elements related to the terminals in the electrical connector may be controlled effectively during the production, and the difficulty in producing the elements related to the terminals in the electrical connector may be reduced, improving the production yield of the electrical connector.

What is claimed is:

1. An electrical connector, comprising:

an inner housing having an insertion space, an inner wall surface, an outer wall surface, and a plurality of first openings, wherein the inner wall surface faces toward the insertion space, the outer wall surface faces away from the insertion space, and each of the first openings connects the inner wall surface and the outer wall surface;

two first components;

a plurality of terminals respectively disposed in the two first components and assembled to the outer wall surface of the inner housing along with the two first components, wherein a plurality of connecting ends of the terminals extend from the outer wall surface through the first openings to the insertion space, and another electrical connector is suitable to be inserted into the insertion space along an insertion axis and connected with the connecting ends;

two second components respectively assembled to the inner housing and adapted to shield the connecting ends and the first openings;

two metallic sheets respectively assembled to the inner housing and respectively stacked on the two second components; and an outer housing accommodating the inner housing, the terminals, the two first components, the two second components, and the two metallic sheets.

2. The electrical connector according to claim 1, wherein the two first components, the two second components, the two metallic sheets, and the terminals are disposed symmetrically with respect to the inner housing.

3. The electrical connector according to claim 1, wherein a gap exists between each of the two first components and the inner housing along the insertion axis, and a respective one of the two second components fills the gap.

4. The electrical connector according to claim 1, wherein the second components are structurally connected subsequently between the first components and the inner housing.

5. The electrical connector according to claim 1, wherein the first components have a positioning protrusion, the inner housing has a first positioning groove, and the positioning protrusion is fitted into the first positioning groove.

6. The electrical connector according to claim 1, wherein the metallic sheets have a plurality of positioning bends respectively fitted into a second positioning groove of the inner housing and a third positioning groove of the first components.

7. The electrical connector according to claim 1, wherein the metallic sheets further have a plurality of bent contact fingers, the inner housing further has a plurality of second openings connecting the inner wall surface and the outer wall surface, and the bent contact fingers pass through the second openings and protrude from the inner wall surface.

8. The electrical connector according to claim 1, further comprising a grounding sheet disposed in the inner housing and partially extending into the insertion space.

9. The electrical connector according to claim 1, wherein the inner housing comprises two inner housing parts forming a closed annular structure and the insertion space, each of the inner housing parts has part of the outer wall surface, part of the inner wall surface, and part of the first openings.

10. The electrical connector according to claim 9, further comprising a grounding sheet assembled and clamped between the two inner housing parts.

11. An electrical connector, comprising:

an inner housing having an insertion space, an inner wall surface, an outer wall surface, and a plurality of first openings, wherein the inner wall surface faces toward the insertion space, the outer wall surface faces away from the insertion space, each of the first openings connects the inner wall surface and the outer wall surface, and the inner housing comprises two separated inner housing parts forming a closed annular structure and the insertion space;

two terminal modules, wherein each terminal module comprises a first component and one set of terminals;

each terminal module disposed on the outer wall surface of the inner housing, wherein a plurality of connecting ends of the terminals extend from the outer wall surface through the first openings to the insertion space, and another electrical connector is suitable to be inserted into the insertion space along an insertion axis and connected with the connecting ends;

an outer housing accommodating the inner housing, the terminals, and the two first components; and a grounding sheet, assembled and clamped between the two separated inner housing parts.

12. The electrical connector according to claim 11, further comprising two metallic sheets and two second components, wherein the two second components are respectively assembled to the inner housing and adapted to shield the connecting ends and the first openings and the two metallic sheets are respectively assembled to the inner housing and respectively stacked on the two second components, and the two metallic sheets are accommodated in the outer housing.

13. The electrical connector according to claim 12, wherein the two first components, the two second components, the two metallic sheets, and the terminals are disposed symmetrically with respect to the inner housing.

14. The electrical connector according to claim 12, wherein a gap exists between each of the two first components and the inner housing along the insertion axis, and a respective one of the two second components fills the gap.

15. The electrical connector according to claim 12, wherein the second components are structurally connected subsequently between the first components and the inner housing.

16. The electrical connector according to claim 12, wherein the metallic sheets have a plurality of positioning bends respectively fitted into a second positioning groove of the inner housing and a third positioning groove of the first components.

17. The electrical connector according to claim 12, wherein the metallic sheets further have a plurality of bent contact fingers, the inner housing further has a plurality of second openings connecting the inner wall surface and the outer wall surface, and the bent contact fingers pass through the second openings and protrude from the inner wall surface.

18. The electrical connector according to claim 11, wherein the first components have a positioning protrusion, the inner housing has a first positioning groove, and the positioning protrusion is fitted into the first positioning groove.

19. The electrical connector according to claim 11, wherein the grounding sheet is disposed in the inner housing and partially extending into the insertion space.

20. The electrical connector according to claim 11, wherein each of the inner housing parts has part of the outer wall surface, part of the inner wall surface, and part of the first openings.

* * * * *